Figure 1:
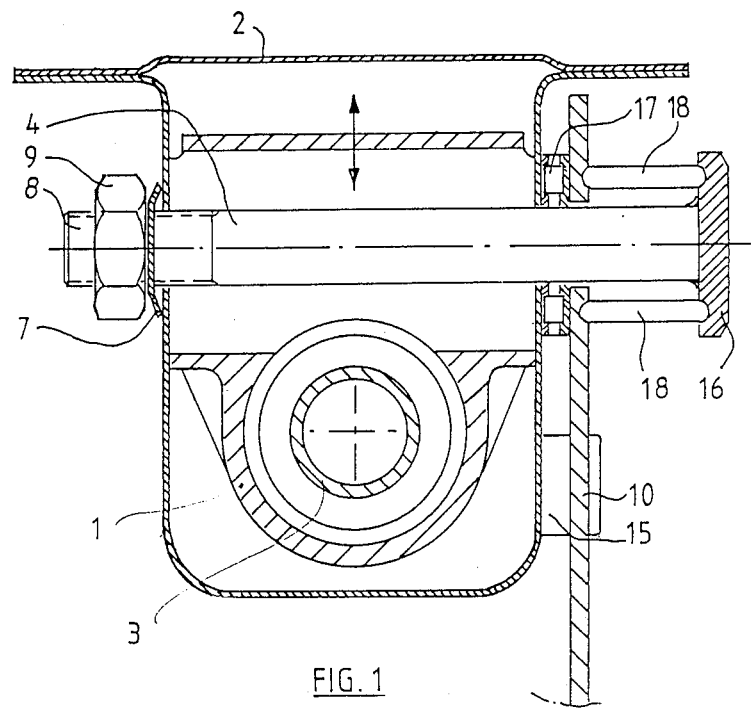

United States Patent [19]

Kester

[11] Patent Number: 4,788,880
[45] Date of Patent: Dec. 6, 1988

[54] CLAMPING MECHANISM FOR FIXING A STEERING COLUMN HOUSING

[75] Inventor: Wilhelmus L. M. Kester, Eersel, Netherlands

[73] Assignee: Volvo Car B.V., Helmond, Netherlands

[21] Appl. No.: 41,797

[22] Filed: Apr. 23, 1987

[30] Foreign Application Priority Data

Apr. 23, 1986 [NL] Netherlands .................. 8601035

[51] Int. Cl.⁴ ............................................. B62D 1/18
[52] U.S. Cl. ........................................ 74/493; 74/591; 403/408.1; 411/535
[58] Field of Search ............... 74/493, 591; 403/408.1; 411/535, 536

[56] References Cited

U.S. PATENT DOCUMENTS

| 2,896,293 | 7/1959 | Love | 248/523 |
| 4,041,796 | 8/1977 | Shishido | 74/493 |
| 4,244,237 | 1/1981 | Sprunger | 74/493 |
| 4,363,499 | 12/1982 | Watanabe et al. | 280/775 |
| 4,541,298 | 9/1985 | Strutt | 74/493 |

FOREIGN PATENT DOCUMENTS

| 902586 | 12/1953 | Fed. Rep. of Germany . | |
| 2430604 | 1/1976 | Fed. Rep. of Germany | 74/493 |
| 1581191 | 9/1969 | France . | |
| 2491024 | 4/1982 | France . | |
| 57-58557 | 4/1982 | Japan | 74/493 |
| 1523638 | 9/1978 | United Kingdom . | |
| 2078849 | 1/1982 | United Kingdom . | |
| 2113164 | 8/1983 | United Kingdom . | |
| 2116496 | 9/1983 | United Kingdom | 74/493 |

Primary Examiner—Lawrence Staab
Assistant Examiner—Scott Anchell

[57] ABSTRACT

Clamping mechanism for a steering column housing adjustable perpendicularly to the longitudinal direction of the steering column, the mechanism comprising a clamping bolt and a lever with which the bolt can be tensioned and the column housing fixed, and a spring-loaded element between housing and bolt, the lever (10) and the bolt (4) being coupled by pins (18) whose center lines cross that of the bolt (4) when it is in released condition, the pins being provided between a cup (16) fixed to the bolt and the lever, the pins being longer than the distance, measured in longitudinal direction, between cup and lever in released condition of the bolt and a certain degree of tilting of the pins on their supporting points being possible.

3 Claims, 2 Drawing Sheets

CLAMPING MECHANISM FOR FIXING A STEERING COLUMN HOUSING

The invention relates to a clamping mechanism for fixing a steering column housing of a motor vehicle, which is adjustable in a direction substantially perpendicular to the longitudinal direction of the steering column and comprising a clamping bolt which is provided movably in longitudinal direction in the steering column housing, as well as a lever with which the bolt can be tensioned and the column housing fixed, and at least one spring-loaded element provided between housing and bolt whereby, when the lever moves in the direction of the clamping position the spring-loaded element is then partly or entirely released, before the lever reaches the clamping position.

Such a clamping mechanism is known from the German patent specification No. 902 586. With this known clamping mechanism the steering column housing is slid on the clamping bolt and the lever is journalled loose on the clamping bolt. On the clamping bolt a nut is provided which is locked against rotation relative to the bolt and is provided with a cam which can co-operate with a notch in the lever. Friction plates are provided on the clamping bolt on both sides of the steering column housing. As long as the cam of the nut is located in the notch of the lever the spring-loaded element is released, the friction plates are unloaded and the clamping connection is removed, so that the steering column housing is displaceable. When as a result of pivoting of the lever the cam is lifted from the notch, whereby the spring is tensioned and the friction plates are loaded, the steering column housing is clamped.

The disadvantage of the known clamping mechanism is that when the steering column housing is fixed there is no feel of the degree of clamping which is reached. It is desirable that there is a certain palpable ∓turning point" in the movement of the lever, i.e. that there is a point whereby the lever, when being moved toward its clamping position, is just a little more difficult to move than shortly therebehind. If such a point is not reached, it must be an indication that play, occuring as a result of wear, must be eliminated.

The aim of the invention is to offer a solution for this problem and is characterized in that the lever and the bolt are coupled by one or more pins whose centre lines cross the centre line of the bolt when it is in released condition, said pins being provided between a cup fixed to the bolt and the lever; the pins being longer than the distance, measured in longitudinal direction, between the cup and the lever in released condition of the bolt and a certain degree of tilting of the pins about their supporting points is possible such that when the lever moves toward the clamping position the pins pass a position in which the centre line of at least one of the pins lies in a plane level with the centre line of the bolt.

The advantage of the clamping mechanism according to the invention is that the clamping action is independent of wear of the thread of the clamping bolt, that the spring-loaded element provides compensation of the unavoidable fitting tolerances and furthermore, that it is possible to give the clamping bolt a certain pre-tension.

A suitable embodiment of the invention consists therein that two pins are present which extend substantially parallel to but, in released condition of the bolt, not quite parallel to the bolt and, when the lever moves toward its clamping position, these pins, when tilting, pass a position in which they are parallel to the bolt.

The invention will be further explained in the following description with reference to the drawing.

Figure 2:
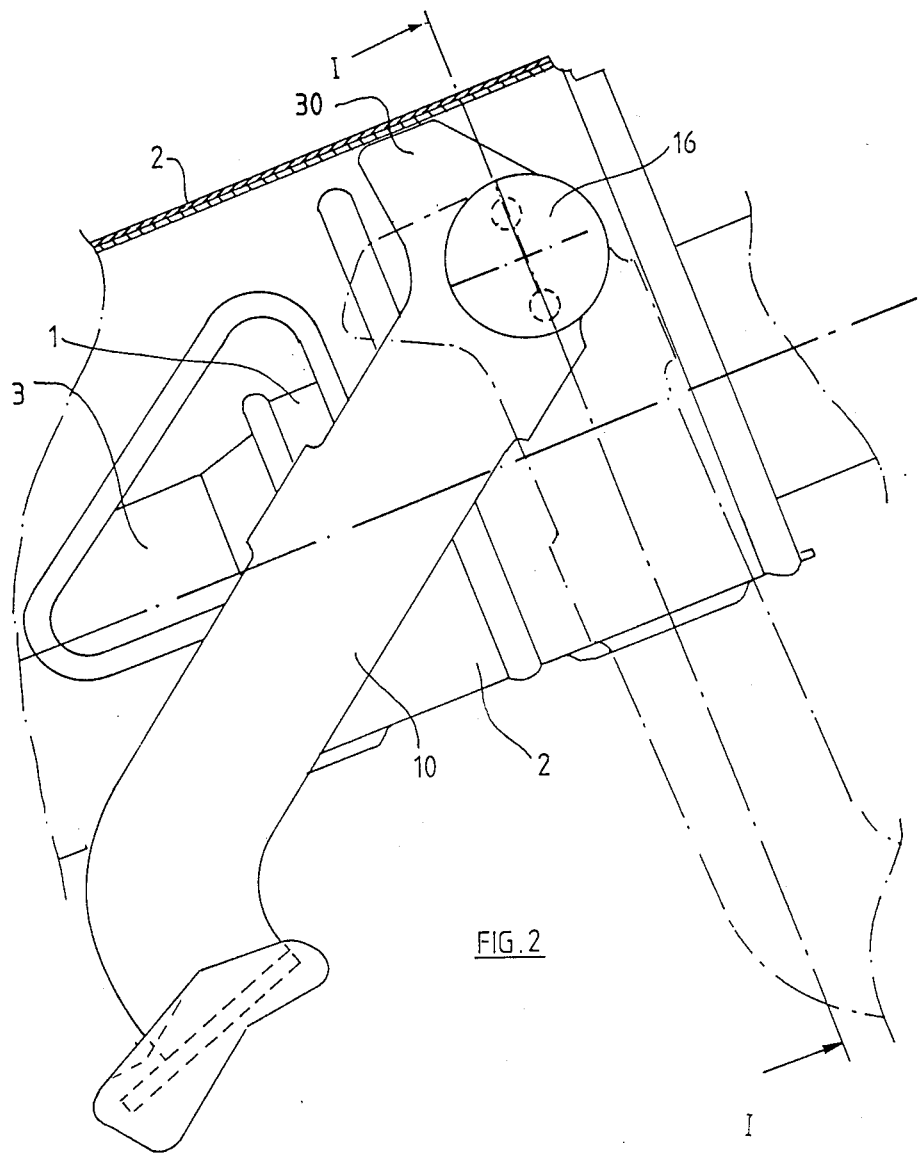

The drawing illustrates in:

FIG. 1 a diagrammatic representation of a suitable embodiment of the invention, in section according to the line I—I in FIG. 2;

FIG. 2 a side view of the embodiment according to FIG. 1, and in

Figure 3:
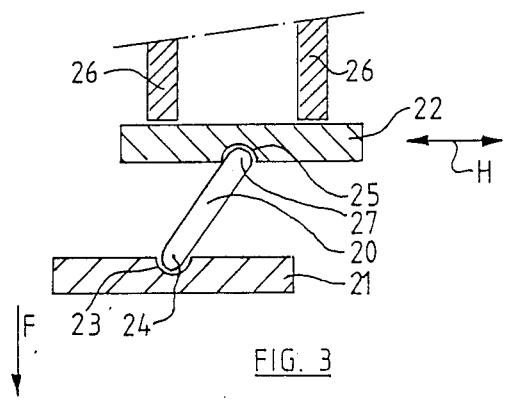

FIG. 3 a diagrammatic drawing of the preferential embodiment of the invention.

In FIG. 1 reference number 1 indicates a steering column housing which is provided under the dashboard panel 2 of the motor car. The steering column 3 is diagrammatically indicated. Said steering column is, with the housing 1, vertically adjustable. In the steering house a clamping bolt 4 is provided, which is provided with a threaded end 8 on which a locking nut is screwed. A Belleville washer 7 is placed between the locking nut 9 and a tubular part of the dashboard panel 2. At the other end of the bolt 4 a catch washer 16 is fixed to the bolt. A lever 10 is provided freely rotatable about the bolt 4, whilst between the lever and the tubular part of the dashboard panel 2 there is located an axial needle bearing 17.

Between the washer 16 and the lever 10 a pair of pins are provided, in such a manner that they extend substantially parallel to the axis of the bolt 4. Provided in the washer 16 and the lever 10 are fitting holes, journalling the pins. Said pins are somewhat longer than the distance, measured in the direction of the axis of the bolt 4, between the journalling locations of the pins in washer 16 and lever 10. This means that when the pins 18, by rotation of the lever 10, are tilted into a position exactly parallel to the axis of the bolt, a tensile force against the action of the spring 7 is exerted in the bolt 4. This force is then the clamping force for fixing the steering column. The pins 18 are furthermore provided in such a manner that they still allow a small further movement (at an angle of about 10°) of the lever 10 before it strikes the stop 15. It is true that because of this further tilting of the pins 18 the clamping force slightly decreases but this has appeared not to be disadvantageous. The case is that when the lever 10 is moved a slightly greater force has to be overcome shortly before reaching the stop, and this can be felt. Moreover when this feeling does not occur it is a sign that the nut 9 needs to be readjusted. No. 30 illustrates another cam for the stop in the other direction.

FIG. 3 illustrates another diagrammatic drawing of the principle that underlies the preferential embodiment of the invention according to FIGS. 1 and 2. It is possible hereby to exert a force on the object 21 by moving the operating means 22 in the direction of the arrow H by means of the element 20. The tilting of the element 20 is reached here by a rectilinear movement. Also other movements are conceivable, whereby the element 20 performs a tilting. The device for exerting a clamping force on an object 21 according to FIG. 3, according to the invention, is characterized in that it is provided with at least one element 20 for transmitting a force whose longitudinal direction is substantially parallel to the direction in which the force F is exerted, with an operating means 22, means 23 for fixing the position of one end 24 of the element 30, means 25 in the operating means 22 for acting on the other end 27 of the element 20 and means 26 for exerting a force opposed to the desired force F to be exerted, so that the operating means moves substantially in one plane. The movement of the operating means 22 will be limited to such an extent (not shown), that the element 20 can assume two positions which are asymmetric relative to the perpendicular position.

What is claimed is:

1. Clamping mechanism for fixing a steering column housing of a motor vehicle, which is adjustable in a direction which is substantially perpendicular to the longitudinal direction of the steering column, said mechanism comprising a clamping bolt which is provided in the steering column housing, a lever with which the bolt can be tensioned and the column housing fixed, and at least one spring-loaded element provided between housing and bolt, the lever (10) and the bolt (4) are coupled by one or more pins (18) whose center lines are not parallel to that of the bolt (4) when the clamping mechanism is in a released condition, said pins being held by cups formed in the bolt and the lever, the pins being longer than the distance, measured along the length of the bolt, between said cups when said lever is in the released condition, and said pins exhibit a certain degree of tilting such that when the lever moves toward a clamping position the pins pass a position in which the center line of at least one of the pins is parallel with the center line of the bolt.

2. Clamping mechanism according to claim 1, characterized in that there are two pins (18).

3. Device for exerting a force (F) on an object (21), characterized in that the device is provided with at least one elongated element (20) for transmitting said force (F) to the object (21), an operating means (22) having a first means (25) for acting on a first end (27) of said elongated element (20), said object (21) having a second means (23) for acting on an opposing, second end (24) of said elongated element (20), and support means (26) acting on said operating means (22) for supplying a reaction force opposed to said force (F) to be exerted, said force (F) is exerted when the operating means (22) moves substantially in a plane parallel to said support means (26) such that the longitudinal direction of said elongated element (20) is adjusted substantially parallel to the direction in which said force (F) is to be exerted.

* * * * *